UNITED STATES PATENT OFFICE 2,595,465

STRUCTURES INVOLVING PARTICLES OR MINERAL GRANULES TREATED WITH ORGANIC SILICON COMPOUNDS AND METHOD OF MAKING

Howard B. Keene and Douglas A. Anderson, St. Paul, and Paul H. Aldrich, Minneapolis, Minn., assignors to Minnesota Mining & Manufacturing Company, St. Paul, Minn., a corporation of Delaware No Drawing. Application November 24, 1944, Serial No. 565,054

16 Claims. (Cl. 117—27)

This invention relates to the provision of organophilic surfaces on normally hydrophilic inorganic or mineral particles, which is important, for example, in providing or effecting adhesion between such particles and organophilic plastic bonding materials. This invention further concerns the provision of surface treatments which are effective in providing such organophilic surfaces on inorganic or mineral particles even when surfaces of the latter contain substantial amounts of water-soluble material. As a specific example of an especially contemplated material, having a hydrophilic surface and which it is desired to bond by means of an organophilic plastic bonding material, colored roofing granules may be mentioned.

In the production of bituminous roll roofing and asphalt shingles, for example, colored surface coated roofing granules are commonly applied, as a layer or coating, to the heated asphalt-impregnated and -coated fibrous base sheet material, and pressed into place by means of rollers. Water is then normally sprayed over the sheet so as to cool and harden the asphalt preparatory to cutting and packing of the finished roofing. All mineral substances commonly used in the production of roofing granules are naturally hydrophilic, that is, much more readily wet by water than by asphalt or hydrocarbon oils. During the spray cooling operation, and also under the action of rainfall when the roofing is later first placed in use, the water forms a film around each individual granule, and, unless the granule is very firmly and effectively bonded to the asphalt, tends to break the bond between the granule and the asphalt, and to permit the ready disengagement of the granule from the asphalt surfaced sheet or shingle, especially upon impact of hail stones or when workmen or even squirrels, or the like, walk on the roof.

To meet this difficulty attempts have been made to pre-coat the granules with various organophilic materials. Hydrocarbon oils, such as "slate oil," normally applied as a lubricant and anti-dust coating, are ineffective in changing the character of the granule surface, although they do soften the adjacent asphalt and thus permit deeper embedding of the granule, and consequently somewhat more secure anchorage thereof, in the asphalt bond.

Hydrophilic granules have also been treated with a water-soluble potentially reactive phenol-aldehyde resinous material which is later heat-reacted to the insoluble stage to form an oriented organophilic surface coating. In this connection, and as a general reference to prior art, note U. S. Patent No. 2,164,329, granted July 4, 1939, to Clifford L. Jewett. The organophilic surface produced by this means is much more readily wet by asphalt than by water, and accordingly water does not penetrate and break the bond between granule and asphalt in the finished roofing. Furthermore, the coating is of insufficient thickness to alter the appearance of the thus treated granule.

Natural mineral granules, and in general the high-temperature ceramic glaze coated granules, have thus previously been successfully provided with an organophilic surface; and correspondingly more permanent bonding between such granules and asphalt has thereby been made possible.

According to the newer practice artificial colored roofing granules having improved range and intensity of colors, made with heat-sensitive organic pigments by various low-temperature processes, have tended to replace the older materials. Many of the newer low-temperature coatings or glazes have been found to be slightly water-soluble, i. e. to contain small percentages of water-soluble materials; and it has been found that under such conditions treatment with a phenolic resin is impossible or, at best, highly unsatisfactory. Even where such resin may be successfully applied to the granule and reacted to the insoluble stage, the organophilic phenol-aldehyde resin surface coating is not permanent, but rapidly becomes ineffective on exposure of the treated granule or the coated shingle to water.

It has now been found that various inorganic surfaces, which may contain small but significant amounts of water-soluble materials, and which are normally hydrophilic in character, may be made permanently organophilic, as well as water-repellent, and without altering their appearance, by treatment with traces of organic silicon compounds, e. g. certain substituted silicanes applied from solution in non-reactive organic solvents.

Various organic silicon compounds have heretofore been employed in forming strongly hydrophobic or water-repellent surfaces on such widely different materials as cellulose, metals, and ceramics. For example, contact of glass surfaces with dimethyl dichlorosilicane in vapor form has provided a water-proofing action highly useful in connection with the visual inspection of liquid levels in measuring-cyclinders, draft gauges, and the like. However, the objects so treated contained essentially no water-soluble materials; and organophilic properties were not required.

As one possible explanation for this novel property of the substituted silicanes which we have now discovered, namely, the property of forming a permanently organophilic as well as water-repellent surface on inorganic solids containing water-soluble materials, but without intent to be limited thereto, we advance the following theory:

The surfaces of all inorganic solids normally are covered with a very thin or molecular film of water. Contact of the substituted silicane with this water results in hydrolysis of the silicane, molecular orientation of the hydrolyzed silicane with respect to the hydrophilic inorganic surface, firm bonding of the hydrolyzed silicane to the inorganic surface, and possibly subsequent polymerization or condensation of the hydrolyzed and oriented silicane in situ to an organophilic polymer which, whether as a continuous layer or, more likely, as a number of separate points or areas on the inorganic surface, is then in stable equilibrium with said inorganic surface. Presence of additional water, and even gradual leaching out of the soluble salts, is then insufficient to upset the equilibrium conditions and thus to remove any significant portion of the organophilic polymer. On the other hand, the phenol-aldehyde resin coating, herein previously mentioned, even when it can be formed thereon, is in unstable equilibrium with the inorganic surface, and any disruption of this coating then results in the rapid dislodging of the entire coating on contact with water. In support of this theory, we have noted that roofing granule particles containing quite high proportions of water-soluble material when treated with the phenol-aldehyde resin are not wet by asphalt when first placed in water, whereas water is readily and completely displaced by asphalt from the surface of similar granules treated with a silicane. In making this observation, we may use a soft flux asphalt, or a mixture of hard asphalt and a hydrocarbon oil; for example, a mixture of 135 parts of saturating asphalt of 140° F. melting point (ball and ring) with 100 parts of slate oil may be used. The granules are first placed in a beaker and covered with water. To about 10 grams of granules are then added about 2 grams of the soft asphalt mixture, and the whole is well stirred for from two to five minutes. The granules are then inspected, and the percentage of those which have been completely covered with the asphalt is estimated. By means of this test, we have obtained the following results:

| | Per cent covered |
|---|---|
| Untreated hydrophilic granules | 0 |
| Bakelite-treated high-temperature granules | 80 |
| Bakelite-treated low-temperature granules | 0 |
| Silicane-treated low-temperature granules | 90–100 |

While vapor phase treatment of inorganic particles, e. g. roofing granules, has been found to produce useful results, we have found that at least equally advantageous results can be secured much more simply and economically by means of a liquid phase treatment, as will be more fully described in the following specific examples, in which all parts are given as parts by weight.

*Example 1*

In this example, an alkoxy silicane is used for the surface-treatment of low-temperature type artificial roofing granules. The granules are prepared, for example, by completely and uniformly coating 100 parts of crushed and graded (35-mesh) mineral aggregate, such as traprock or greystone, with a suspension of 1 part chromium oxide in 6 parts of sodium silicate; pre-drying the coated granules at about 220° F. in a steam-heated rotary kiln; and further drying and firing the coated granules in a rotary direct-fired kiln at 400 to 600° F. Although such treated granules are somewhat resistant to the leaching action of water, they nevertheless gradually lose a considerable portion of the surface coating on long contact with water. A further treatment may therefore be applied, which consists of spraying the granules as they come from the kiln with a dilute (5 to 8%) solution of citric acid in an amount sufficient to provide 2 to 8 pounds of acid per ton of granules. The silicate surface coating is thereby presumably converted to insoluble silica, but the resulting soluble sodium citrate, together with unreacted alkali and/or other soluble material, remains in or within the coating. Such granules have a hydrophilic surface, and obviously contain a small but appreciable amount of water-soluble material; this water-soluble portion may be removed, as by prolonged and costly leaching, but may be disregarded when using the further treatment of our invention.

The alkoxy silicane may be prepared as follows: To 165 parts by weight of a non-volatile hydrocarbon oil, contained in a glass-lined jacketed reaction vessel fitted with agitator and reflux condenser, are added 195 parts of alpha-picoline, 170 parts of silicon tetrachloride, and 148 parts of tertiary butyl alcohol. The reaction proceeds with evolution of heat, and the temperature is carried, with external heating or cooling where required, to 200° F. The batch is held at 200° F. for 15 minutes with continual agitation, and is then cooled to 90° F. and allowed to settle. The alkoxy silicane dissolved in the oil forms an upper layer, which is decanted from the solidified lower layer of water-soluble picoline hydrochloride. The product consists of the solution, in the hydrocarbon oil, of approximately 60% by weight of alkoxy silicanes, of which the major proportion is di-t-butoxy dichloro silicane, with small amounts of mono-t-butoxy trichloro silicane and/or tri-t-butoxy monochloro silicane also present. Before being applied to the granules, this product is further diluted with additional amounts of the hydrocarbon oil in the ratio of 7 parts of the 60% solution to 93 parts of oil. No. 635 oil from the Texas Company, is an example of a satisfactory hydrocarbon oil or "slate oil"; it has an A. P. I. gravity of 26; S. U. viscosity at 100° F. of 312, and at 212° F. of 51.5 seconds; flash test of 430° F.; fire test of 485° F.; and pour test of 20° F.

In the normal process of granule manufacture, the heat-treated granules pass from the rotary kiln to a rotary cooler, where they are cooled and also customarily treated with slate oil, before passing to storage. In the present example, as they enter the cooler they are sprayed with a controlled amount of water, which is then allowed to evaporate and thereby to cool the granules until, at a subsequent point in the cooler, they have reached a temperature of 170–180° F. and a moisture content of 2–5 lbs. of water per ton of granules. They are then further sprayed with an amount of the silicane solution sufficient to provide about 5 lbs. of slate oil and correspondingly about one-quarter pound of silicane per ton of granules. This solution is applied uniformly to all granules surfaces, the remaining moisture is removed, and the granules are cooled to room temperature, by the continued action of the rotary cooler. Granules so treated are found to be water-repellent and readily wet by fluid asphalt even in the presence of water; and they provide a superior type of product for use in the surfacing of asphalt roofing and the like.

Example 2

Low-temperature artificial colored roofing granules are prepared by coating a crushed and graded slate aggregate with a phthalocyanine pigment in a sodium silicate base cementing composition which is subsequently set up to a weather-resistant state by reaction at 200–400° F. with a reactive fluorine-containing compound such as magnesium fluosilicate. The dry granules are treated at about 140° F. with a solution of diethyl dichlorosilicane in slate oil, of sufficient concentration and in sufficient amount to supply 5 lbs. of oil and $\frac{1}{20}$ lb. of silicane per ton of granules. Uniform coating is obtained by tumbling in a rotary tube such as the rotary cooler of Example 1, while cooling the granules to room temperature.

The treated granules are organophilic and form a good bond with asphalt even in the presence of water, and/or after prolonged water extraction; the treatment is weather resistant, abrasion resistant, and is also resistant to hydrolysis even at elevated temperatures.

Example 3

Road aggregate consisting of crushed and graded trap rock is treated with five pounds per ton of a five percent solution in slate oil of alkoxy dichlorosilicanes derived from equal molar portions of isopropyl alcohol and tertiary butyl alcohol, i. e., comprising a di-alkoxy dichlorosilicane containing substantially equal numbers of isopropoxy and t-butoxy groups. The silicanes are prepared by the method described under Example 1. The treated aggregate is found to be organophilic, has good adhesion to asphalt, and provides an effective material for use in the surfacing of roads.

The silicane treatment as herein described is of greatest value in connection with the provision of organophilic surfaces on granules containing appreciable amounts of water-soluble materials, such as the so-called "low temperature" artificial colored roofing granules previously mentioned, which as indicated could not satisfactorily be treated by prior known methods. However, completely insoluble materials may also be advantageously treated. However, there are also distinct advantages to be gained in the substitution of our novel silicane treatment for previously known treatments such as that with phenolic resins. For example, road aggregate may be treated without subsequent heating, as in Example 3. "High-temperature" artificial colored glazed roofing granules may likewise be treated without additional or prolonged heating, and furthermore may be simultaneously treated with slate oil or the like. The silicane-treated surfaces remain organophilic even under considerable abrasion.

One of the chief advantages of our invention as related to the roofing granule art lies in the application of the organophilic surfacing material in solution in a non-volatile hydrocarbon oil which itself forms a desirable coating on the finished granule. In this or other related arts, particularly where color is not important, asphaltic or other highly colored oils may be used; thus in the treatment of road aggregate as in Example 3, a liquid asphalt may be used as the carrier medium for the silicane.

Various other volatile or non-volatile liquid solvents may also be used; but such solvents must be selected so as not to react with the silicane. Solvent of the ether type, or chlorinated hydrocarbons, may in general be used; but solvents such as alcohols readily react with silicanes and are obviously not satisfactory. Volatile hydrocarbons may of course be utilized; a solution of a silicane in heptane, for example, has been used for the successful treatment of roofing granules to form an organophilic surface thereon.

Other specific examples of silicanes which will produce organophilic surfaces on roofing granules and the like are: mono-t-amoxy trichlorosilicane; di-t-amoxy dichlorosilicane; mono-t-butoxy trichlorosilicane; di-t-butoxy dichlorosilicane; crude reaction products consisting of mixtures of mono-, di-; and tri-t-amoxy chlorosilicanes; propoxy-t-butoxy dichlorosilicane; dichlorosilicanes derived from mixtures of fusel oil and t-butyl alcohol; t-butoxy-iso-amoxy dichlorosilicane; t-butoxy-methoxy dichlorosilicane; di-t-butoxy dihydroxy silicane; di-t-butoxy diaminosilicane; tri-n-butyl aminosilicane; di-n-propyl dichlorosilicane; phenyl trichlorosilicane; n-decyl trichlorosilicane; monoethyl trichlorosilicane; and diethyl dichlorosilicane.

In general, we have found that those organic compounds of silicon are preferred which are derivatives of silicon tetrahydride, $SiH_4$ (also known as "silicane" or "silane"), in which at least one of the hydrogens is replaced by an alkyl, aryl, alkoxy or aryloxy group, and at least one hydrogen is replaced by a halogen or by an amino or hydroxy group; or simple compounds which are obtained by intra- or inter-polymerization of such derivatives having two or more amino or hydroxy groups. To be effective for our purposes, the organic silicon compound must have at least one group permitting orientation of the hydrophilic mineral surface, and at least one group permitting an organophilic relationship to asphalt or the like.

In applying the compounds of these various classes to the hydrophilic surfaces of roofing granules and the like, we find certain differences in technique to be desirable depending on the particular class of compound being applied. For example, it appears to be desirable to apply a slight amount of moisture to the granules prior to treatment with the alkoxy chlorosilicanes, as indicated in Example 1. However, in the presence of water these compounds are broken down rather rapidly, particularly at elevated temperatures; and it therefore becomes necessary to lower the temperature of the granules to not over 180° F., more or less, before application of the silicane solution. After treatment, it is further necessary to remove all moisture from the granules, and it is also advisable to cool them to room temperature, before placing the treated granules in storage, in order to avoid subsequent hydrolysis of the coating and consequent partial reduction of organophilic properties.

Certain differences in the granules also may affect the technique used in applying the silicane treatment. Thus it is sometimes desirable to add a small amount of ammonia, or, where the granule coating contains free alkali, of ammonium chloride, to the water applied to the hot granules as in Example 1, in order to provide free ammonia, the presence of which appears to have a beneficial effect in providing an improved organophilic treatment, particularly with the alkoxy silicanes.

Due, probably, to the presence of a minute film of water even on granules direct from the low-temperature kiln, it is possible in many cases to obtain organophilic properties with the alkoxy chlorosilicanes even without the addition of water. This is even more true of the alkyl chlorosilicanes, which as shown in Example 2 will produce an organophilic surface by application in hydrocarbon solution to the heated granules as they come from the kiln and without intermediate moistening. The organophilic surfaces thus produced also seem to be somewhat more stable towards subsequent heating in the presence of moisture than are the surfaces produced with the alkoxy compounds.

While we have found that resinous polymers of organic silicanes applied in a voltatile solvent and dried in place on the granules will produce beneficial results, we prefer to use the monomeric compounds, since these latter materials are effective in considerably lower concentrations and do not require the evaporation of solvent in order to establish a permanent organophilic surface. The monomeric silicanes are capable of molecular orientation on the granule prior to polymerization, which occurs in situ; and an effective bond between final polymer and original granule surface is thereby more readily established. However, dimers or other low polymers of our silicanes, which are still sufficiently mobile and reactive to establish proper orientation at the granule surface also have preferred properties. In the foregoing discussion, "polymerization" or other similar terms refers to the apparent reaction of the original silicane in forming the permanent, organophilic surface layer obtained; it may or may not be concerned with increases in molecular weight, and accordingly we do not wish to be limited to any specific theory as to the mechanics of the formation of our new improved granule surface.

Hydrolysis of an organic chlorosilicane, it will be readily appreciated, will result in the liberation of hydrogen chloride; and this substance is actually liberated on treatment of moisture-containing granules with e. g. di-t-butoxy dichlorosilicane. The very small amount of acid thus produced is normally without effect on the granule. However, in the case of granules which are susceptible to the action of such acids, for example those carrying a basic pigment which changes color by reaction with hydrogen chloride, it may be desirable to use other types of silicanes, such as the organic amino silicanes or the like.

What we claim is:

1. The process of forming colored roofing granules having improved anchorage in asphalt coatings, comprising: coating base granules with a colored coating composition comprising water-soluble sodium silicate; converting the silicate to insoluble silica at a temperature not above about 600° F. and without removing the small but appreciable amount of water-soluble material remaining after such conversion; and applying to the hydrophilic surface of the resultant granules a thin coating of a solution in a hydrocarbon of a substituted silicane capable of molecular orientation with respect to a hydrophilic mineral surface, said silicane being selected from the group consisting of alkyl, aryl, alkoxy and aryloxy silicanes containing at least one readily hydrolyzable inorganic radical attached to silicon.

2. The process of forming colored low-temperature type roofing granules having an organophilic and water-repellent surface of such character that water in contact with said surface and at room temperature is preferentially displaced from said surface by soft asphalt, comprising: coating base granules with a colored coating composition comprising water-soluble sodium silicate; converting the silicate to insoluble silica at a temperature not higher than about 600° F. and without removing the small but appreciable amount of water-soluble material remaining after such conversion; and coating the thus treated granules with a thin layer of a solution in an organic solvent of an organic silicon compound selected from the group consisting of alkyl, aryl, alkoxy and aryloxy silicanes having one to three readily hydrolyzable radicals attached to silicon.

3. The process of claim 1 in which the substituted silicane is diethyl dichlorosilicane.

4. The process of claim 1 in which the substituted silicane is a mixture of alkoxy chlorosilicanes consisting preponderantly of di-t-butoxy dichlorosilicane.

5. The process of claim 1 in which the substituted silicane is a di-alkoxy dichlorosilicane containing substantially equal numbers of isopropoxy and t-butoxy groups.

6. The process of forming colored roofing granules having improved anchorage in asphalt coatings, comprising: coating base granules with a colored coating composition comprising water-soluble sodium silicate; converting the silicate to insoluble silica at a temperature not above about 600° F. and without removing the small but appreciable amount of water-soluble material remaining after such conversion; and applying to the hydrophilic surface of the resultant granules a thin coating of a solution in liquid hydrocarbon of an organic silicon compound formed in the aminolysis of a chlorosilicane selected from the group consisting of alkyl, aryl, alkoxy and aryloxy silicanes having one to three chlorine atoms attached to silicon.

7. The method of coating a hydrophilic inorganic surface formed by coating a supporting inorganic base with a coating composition comprising water-soluble sodium silicate and then converting the silicate to insoluble silica at a temperature not above about 600° F. and without removing the small but appreciable amount of water-soluble material remaining after such conversion, with a t-alkoxy-substituted silicane, which method comprises forming a t-alkoxy chlorosilicane in an organic solvent, and applying the thus formed solution to said hydrophilic inorganic surface.

8. Colored roofing granules having an organophilic and water-repellent surface of such character that water in contact with said surface and at room temperature is preferentially displaced from said surface by soft asphalt, said granules being the product of the process of claim 1.

9. Colored roofing granules containing water-soluble material and produced by a process comprising coating base granules with a colored coating composition comprising water-soluble sodium silicate and then converting the silicate to insoluble silica at a temperature not above about 600° F. and without removing the small but appreciable amount of water-soluble material released thereby, said granules having an organophilic and water-repellent surface coating of such character that water in contact with said surface coating and at room temperature is preferentially displaced from said surface coating by soft asphalt, said organophilic surface coating comprising an organic compound of silicon having one to three organic groups, selected from the class consisting of alkyl, aryl, alkoxy and aryloxy groups, per silicon atom in the molecule.

10. Mineral aggregate coated with a coating composition comprising water-soluble sodium silicate and heated to a temperature not over about 600° F. to convert the silicate to insoluble silica without removing the small but appreciable amount of water-soluble material remaining after such conversion, and having a water-repellent organophilic surface coating of such character that water in contact with said surface coating and at room temperature is preferentially displaced from said surface coating by soft asphalt, said organophilic surface comprising an organic compound of silicon in which the silicon is bonded to at least one tertiary-alkoxy radical.

11. Colored roofing granules having an organophilic and water-repellent surface of such character that water in contact with said surface and at room temperature is preferentialy displaced from said surface by soft asphalt, said granules being the product of the process of claim 6.

12. Colored roofing granules in accordance with claim 11, in which the chlorosilicane is an alkyl chlorosilicane.

13. An artificial colored roofing granule, comprising a mineral base coated with a colored surface coating containing a small but appreciable amount of water-soluble material and formed from a colored coating composition comprising water-soluble sodium silicate by converting the silicate to insoluble silica at a temperature not higher than about 600° F. and without removing the small but appreciable amount of water-soluble material remaining after such conversion, and said granule having a water-repellent, organophilic surface of such character that water in contact with said surface and at room temperature is preferentially displaced from said surface by soft asphalt, said organophilic surface comprising an organic compound of silicon, and said organophilic surface having been formed by applying to the initially hydrophilic colored siliceous surface a thin coating of a solution in an organic solvent of a tertiary-alkoxy amino silicane.

14. As a new manufacture, a sheet material comprising a fibrous base sheet and an adherently attached coating thereon of a water-insoluble organic film-forming binder having as a filler therein a finely divided porous inorganic particulate material the individual particles having been coated with a coating composition comprising a water-soluble sodium silicate and heated to a temperature not above about 600° F. to convert the silicate to insoluble silica and without removing the small but appreciable amount of water-soluble material remaining after such conversion, and said particles further having a water-repellent organophilic surface coating of such character that water in contact with said surface coating and at room temperature is preferentially displaced from said surface coating by soft asphalt, said organophilic surface coating comprising an organic compound of silicon in which the silicon is bonded to at least one tertiary alkoxy radical, the aforesaid adherently attached coating thereby providing a water-repellent sheet product.

15. As as new manufacture, a sheet material comprising a fibrous base, an adherently attached coating thereon of a water-insoluble organic film-forming binder, and, partially embedded in said coating, the colored roofing granules of claim 8.

16. As a new manufacture, a sheet material comprising a fibrous base, an adherently attached coating thereon of a water-insoluble organic film-forming binder, and, partially embedded in said coating, the colored roofing granules of claim 11.

HOWARD B. KEENE.
DOUGLAS A. ANDERSON.
PAUL H. ALDRICH.

REFERENCES CITED

The following references are of record in the file of this patent:

UNITED STATES PATENTS

| Number | Name | Date |
| --- | --- | --- |
| 2,030,737 | Bley | Feb. 11, 1936 |
| 2,030,739 | Bley | Feb. 11, 1936 |
| 2,061,338 | Ward | Nov. 17, 1936 |
| 2,118,893 | Price | May 31, 1933 |
| 2,164,329 | Jewett | July 4, 1939 |
| 2,258,221 | Rochow | Oct. 7, 1941 |
| 2,265,962 | Bent et al. | Dec. 9, 1941 |
| 2,306,222 | Patnode | Dec. 22, 1942 |
| 2,386,259 | Norton | Oct. 9, 1945 |
| 2,390,370 | Hyde | Dec. 4, 1945 |
| 2,412,470 | Norton | Dec. 10, 1946 |
| 2,432,891 | Hervey | Dec. 16, 1947 |
| 2,436,304 | Johannson | Feb. 17, 1948 |
| 2,439,689 | Hyde | Apr. 13, 1948 |
| 2,455,999 | Hyde | Dec. 14, 1948 |
| 2,462,635 | Haber | Feb. 22, 1949 |

FOREIGN PATENTS

| Number | Country | Date |
| --- | --- | --- |
| 203,042 | Great Britain | Sept. 6, 1923 |

OTHER REFERENCES

Kig-Journal Oil Colour Chemists Ass'n, vol. 13, No. 116, pp. 33–34.

Gilliam et al., Journal American Chem. Soc., March 1941, vol. 63, p. 801.

Norton General Electric Review, vol. 4, No. 8, Aug. 1944, pp. 12 and 13.